US011127299B2

(12) United States Patent
Ohrenstein

(10) Patent No.: US 11,127,299 B2
(45) Date of Patent: Sep. 21, 2021

(54) TRAFFIC ALLOWANCE METHOD

(71) Applicant: Robert Ohrenstein, Jerusalem (IL)

(72) Inventor: Robert Ohrenstein, Jerusalem (IL)

( * ) Notice: Subject to any disclaimer, the term of this patent is extended or adjusted under 35 U.S.C. 154(b) by 0 days.

(21) Appl. No.: 16/699,801

(22) Filed: Dec. 2, 2019

(65) Prior Publication Data
US 2020/0302795 A1 Sep. 24, 2020

(30) Foreign Application Priority Data

Mar. 19, 2019 (IL) .......................................... 265495

(51) Int. Cl.
*G08G 1/16* (2006.01)
*H04N 5/247* (2006.01)
*G08G 1/005* (2006.01)
*G08G 1/04* (2006.01)
*B60R 11/04* (2006.01)
*B60Q 9/00* (2006.01)
*G06F 3/01* (2006.01)
*G08G 1/0962* (2006.01)
*B60R 11/00* (2006.01)

(52) U.S. Cl.
CPC ............. *G08G 1/166* (2013.01); *B60Q 9/008* (2013.01); *B60R 11/04* (2013.01); *G06F 3/013* (2013.01); *G08G 1/005* (2013.01); *G08G 1/04* (2013.01); *G08G 1/09626* (2013.01); *H04N 5/247* (2013.01); *B60R 2011/0003* (2013.01); *B60R 2011/004* (2013.01)

(58) Field of Classification Search
None
See application file for complete search history.

(56) References Cited

U.S. PATENT DOCUMENTS

| | | | |
|---|---|---|---|
| 10,688,915 B1 * | 6/2020 | Rastoll | B60Q 1/50 |
| 2017/0050642 A1 * | 2/2017 | Heckmann | B60W 40/04 |
| 2017/0263017 A1 * | 9/2017 | Wang | A61B 3/113 |
| 2018/0264940 A1 * | 9/2018 | Torii | G06K 9/00845 |
| 2019/0250699 A1 * | 8/2019 | Mulase | G06F 3/013 |
| 2020/0249753 A1 * | 8/2020 | Stent | G06K 9/0061 |
| 2021/0094579 A1 * | 4/2021 | Aoki | B60W 60/0025 |
| 2021/0129868 A1 * | 5/2021 | Nehmadi | G06F 16/9035 |

\* cited by examiner

*Primary Examiner* — Edemio Navas, Jr.
(74) *Attorney, Agent, or Firm* — Alphapatent Associates Ltd.; Daniel J. Swirsky

(57) ABSTRACT

A traffic allowance method, including the steps of: installing a first camera to a vehicle, for capturing a driver's head; installing a second camera to the vehicle, for capturing a front of the vehicle; and processing captures of the first and second cameras, for determining that the second camera captures persons which may encounter the vehicle, and for each of the persons, allowing the driver to drive only upon determining that the driver views the person, and that the person views the driver.

8 Claims, 3 Drawing Sheets

TRAFFIC ALLOWANCE METHOD

CROSS-REFERENCE TO RELATED APPLICATIONS

This application claims the benefit of priority from Israel Patent Application No. 265495, filed Mar. 19, 2019, the disclosure of which is incorporated herein by reference.

TECHNICAL FIELD

The invention relates to the field of traffic safety.

BACKGROUND

When a pedestrian wants to cross a road, for example, at a crosswalk, and he sees a vehicle approaching, he does not know whether the vehicle intends to stop before the pedestrian crossing or not.

When a vehicle arrives at the junction for example, and another vehicle arrives at the same intersection quickly, there is no communication between the drivers, and no one knows whether the other driver is about to stop before he enters the intersection. This can cause accidents and injuries to the body and property.

There is a long felt need to provide a solution to the above-mentioned and other problems of the prior art.

SUMMARY

A traffic allowance method, including the steps of determining that a camera captures persons which may encounter the vehicle, and for each of the persons, allowing the driver to drive only upon determining that the driver views the person, and that the person views the driver.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
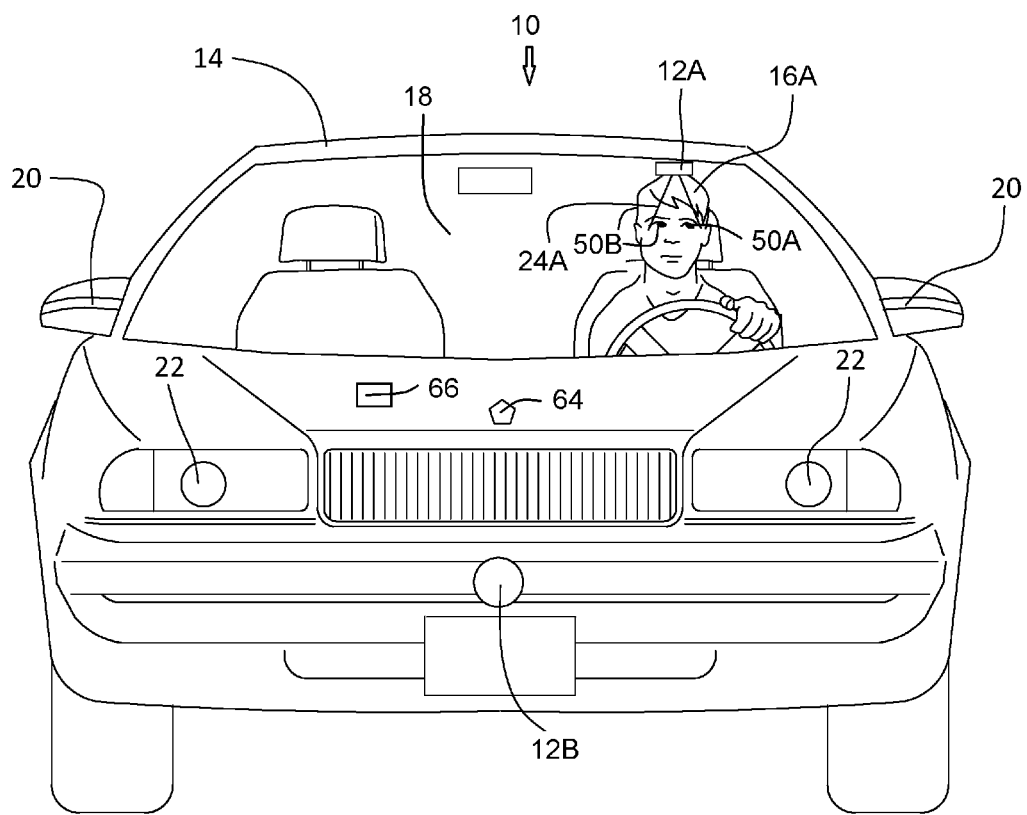
FIG. 1 depicts a traffic allowance system installed to a vehicle, according to one embodiment of the invention.

FIG. 1 depicts a traffic allowance system installed to a vehicle, according to one embodiment of the invention.

A traffic allowance system 10 according to one embodiment includes, for each vehicle 14, a camera 12A, for capturing the driver's eyes; and a camera 12B, for capturing the front of vehicle 14.

Figure 2:
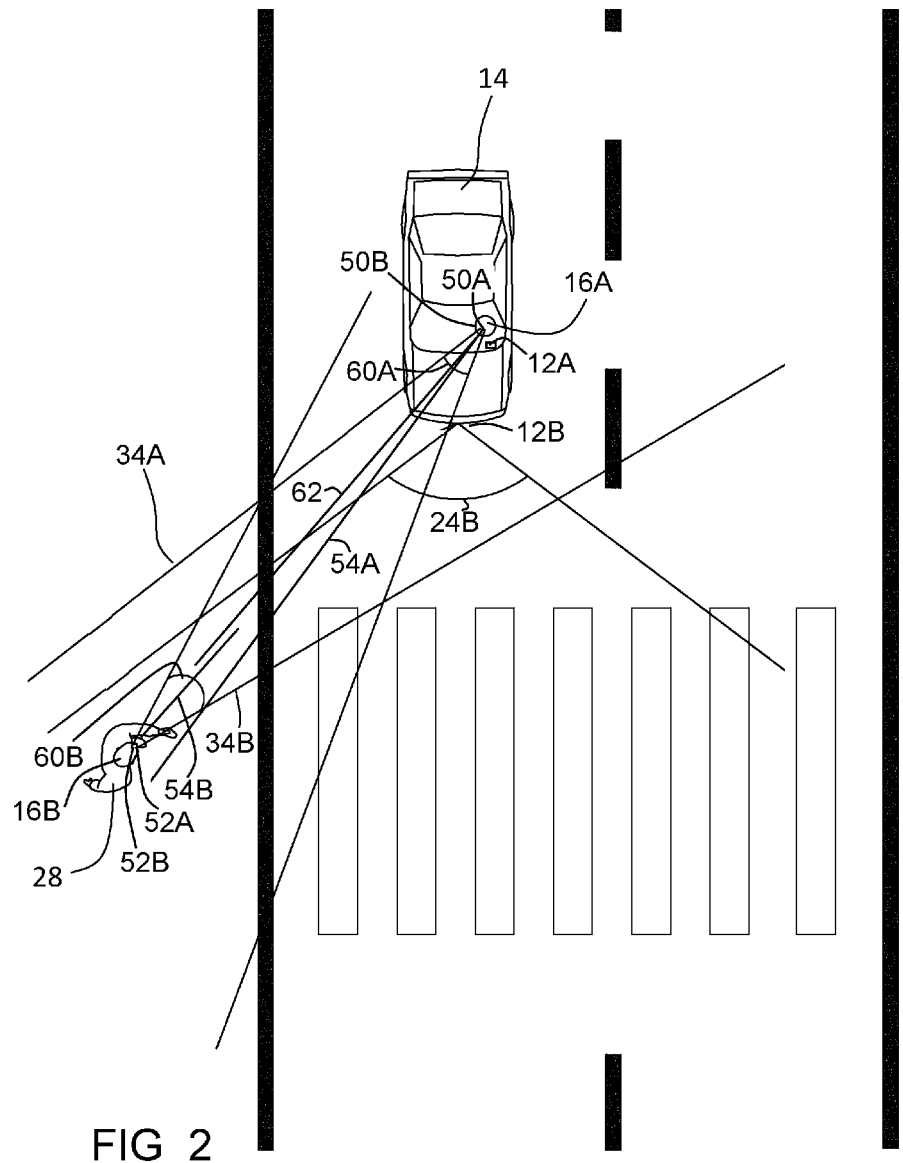
FIG. 2 is a top view of the vehicle having the traffic allowance system of FIG. 1 upon giving allowance to the vehicle.

FIG. 2 is a top view of the vehicle having the traffic allowance system of FIG. 1 upon giving allowance to the vehicle.

The first condition for traffic allowance system 10 for allowing driving is that vehicle 14 is disposed near the passage, and pedestrian 28 has not yet started crossing the road.

The second condition for allowing driving is that the driver views pedestrian 28, and as well pedestrian 28 views the driver.

This is determined by determining the angle of the head 16A of the driver, such as by capturing location of eyes 50A and 50B of the driver by camera 12A, and by determining the angle of the head 16B of pedestrian 28, such as by capturing the location of eyes 52A and 52B of pedestrian 28 by camera 12B.

In the example of FIG. 2, the driver's head is directed towards pedestrian 28 and the pedestrian's head is directed towards the driver's head.

Figure 3:
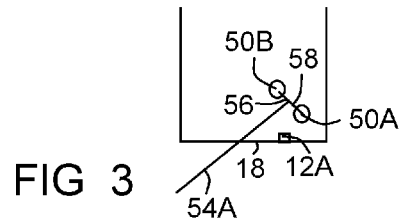
FIG. 3 depicts the determination that the driver's head is directed towards pedestrian 28 and that the pedestrian's head is directed towards the driver.

FIG. 3 depicts the determination that the driver's head is directed towards pedestrian 28 and that the pedestrian's head is directed towards the driver.

The driver's head is directed towards line 54A being right angled 56 to the line 58 between eye 50A and 50B.

Referring again to FIG. 2, even though line 54A misses pedestrian 28, the driver's view 34A is angle 60A surrounding line 54A, thus the driver indeed views pedestrian 28.

The determination of the pedestrian's view 34B is line 54B surrounded by angle 60B, being equal to angle 60A.

The third condition for allowing driving, and referring to FIG. 1, is that the driver reports, such as by a bulb 64, of "I am driving".

Figure 4:
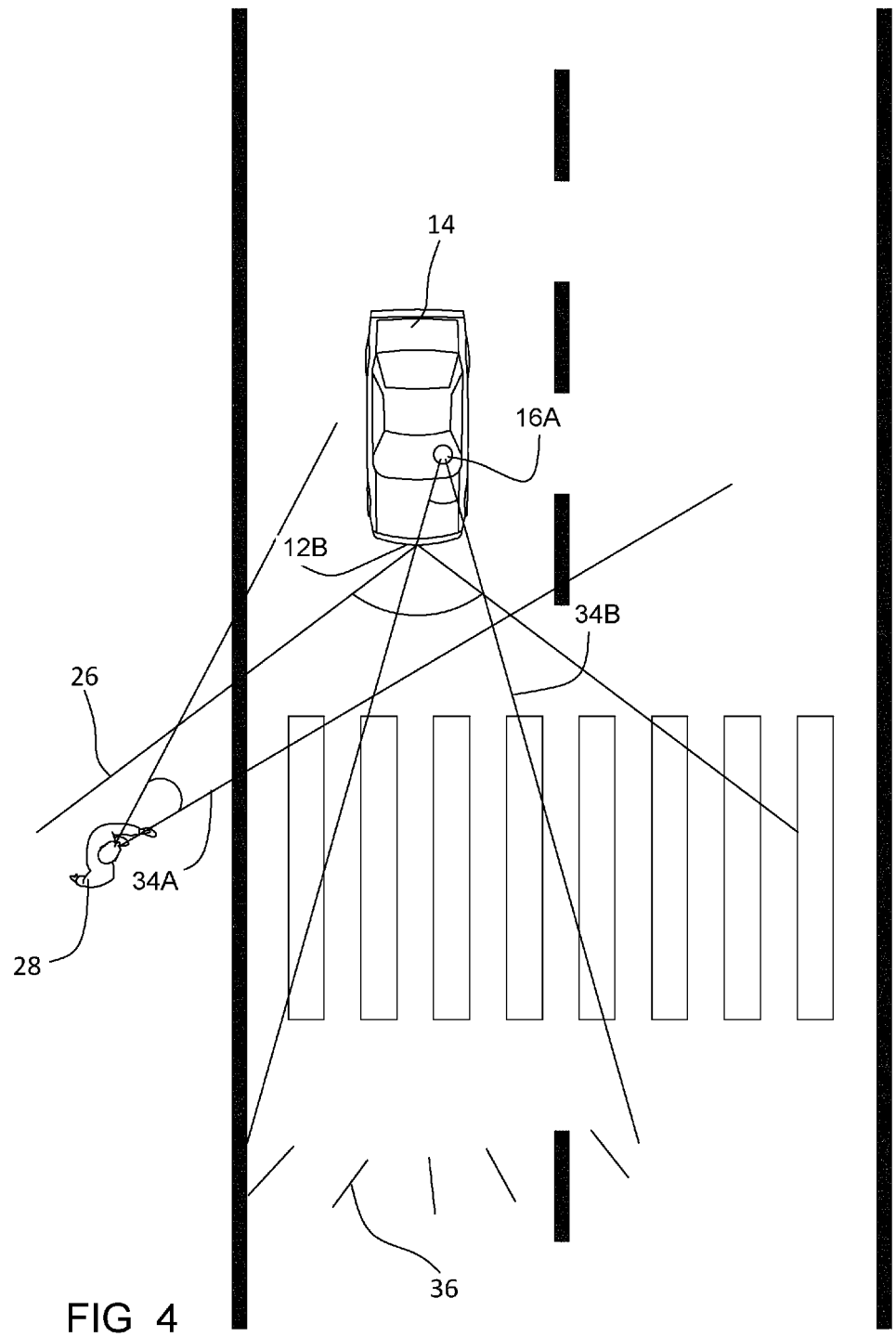
FIG. 4 depicts the determination that the driver's head is not directed towards pedestrian 28 and that the pedestrian's head is directed towards the driver.

FIG. 4 depicts the determination that the driver's head is not directed towards pedestrian 28 and that the pedestrian's head is directed towards the driver.

In this case neither the driver, nor pedestrian 28 is allowed to advance.

Upon the determining that the driver views the person, and that pedestrian 28 views the driver, the system may produce a request to the driver, such as by a loudspeaker 18, to allow pedestrian 28 to cross the road. Allowance of the driver may turn on bulb 64, to report the allowance.

Thus, in one aspect, the invention is directed to a traffic allowance method, including the steps of:

installing a first camera (12A) to a vehicle (14), for capturing a driver's head;

installing a second camera (12B) to the vehicle (14), for capturing a front of the vehicle (14); and processing captures of the first (12A) and second (12B) cameras, for determining that the second camera (12B) captures persons (28) which may encounter the vehicle (14), and for each of the persons (28), allowing the driver to drive only upon determining that the driver views the person (28), and that the person (28) views the driver.

The allowing of the driver to drive, further includes the step of:

reporting to the person (28) intention of driving.

The method may further include the step of:
for each of the persons (28) which may encounter the vehicle (14), determining an angle (62) thereof in relation to the vehicle (14).

The determination that the driver views the person (28), may include the steps of:
capturing the drivers' eyes (50A,50B) by the first camera (12A);
determining a center of driver's view (54A) being right angled (56) to a line (58) between the drivers' eyes (50A,50B);
determining a view (34A) of the driver by an angle (60) surrounding the center (54A) of driver's view; and
determining that the driver views the person (28) in case the angle (62) of the person (28) is included in the driver's view (34A).

The determination of the image processor (66) that the person (28) views the driver, may include the steps of:
capturing the persons' eyes (502,52B) by the second camera (12B);
determining a center of view (54B) of the person being right angled to a line between the persons' eyes (52A, 52B);
determining a view (34B) of the person (28) by an angle (60) surrounding the center (54B) of view of the person (28); and
determining that the person (28) views the driver in case the angle (62) of the person (28) is included in the person's view (34B).

In the figures and/or description herein, the following reference numerals (Reference Signs List) have been mentioned:
numeral 10 denotes the traffic allowance system according to one embodiment of the invention;
12A,12B: cameras;
14: vehicle;
16A: driver's head;
16B: pedestrian's head;
18: visual or vocal device for presenting a request to the driver to allow a person or another vehicle to cross the road;
20: mirror;
22: light;
24A: capturing angle range of camera 12A;
24B: capturing angle range by camera 12B;
28: pedestrian or other person;
34A: driver's view;
34B: pedestrian's view;
36: warning the driver presence of pedestrian 28; this warning requires the steps of allowing the driver to drive;
50A,50B: drivers' eyes;
52A,52B: pedestrian's eyes;
54A: center of driver's view;
54B: center of pedestrian's view;
56: right angle;
58: line between drivers' eyes;
60A: angle surrounding driver's center of view;
60B: angle surrounding pedestrian's center of view;
62: angle of disposition of pedestrian 28;
64: reporting means, being visual or vocal;
66: image processor.

The foregoing description and illustrations of the embodiments of the invention have been presented for the purpose of illustration, and are not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A traffic allowance method, comprising the steps of:
installing a first camera to a vehicle, for capturing a driver's head;
installing the second camera to said vehicle, for capturing a front of said vehicle;
processing captures of said first and second cameras,
for determining that said second camera captures persons which may encounter said vehicle, and
for determining for each of said captured persons, that said first camera determines that eyes of said driver view eyes of the person captured by said second camera, and that said second camera determines that the eyes of the person view eyes of the driver, thereby said determinations ensure human communication between said person and said driver.

2. The traffic allowance method according to claim 1, further comprising the step of:
only upon said determining, allowing the driver to drive by visual and/or vocal means installed to said vehicle.

3. The traffic allowance method according to claim 1, further comprising the step of:
upon said determining, producing a request to said driver by visual and/or vocal means installed to said vehicle, to allow said person to cross a road; and
upon said allowance, turning on an indication device of said vehicle.

4. The traffic allowance method according to claim 2, wherein said allowing the driver to drive further comprises the step of:
reporting to said person intention of driving by visual and/or vocal means installed to said vehicle.

5. The traffic allowance method according to claim 1, further comprising the step of:
for each of said persons which may encounter said vehicle, determining by said second camera an angle of the person in relation to said vehicle.

6. The traffic allowance method according to claim 5, wherein said determination that said driver views the eyes of the person, comprises the steps of:
capturing the drivers' eyes by said first camera;
determining a center of driver's view being right angled to a line between said drivers' eyes;
determining a view of said driver by an angle surrounding said center of driver's view; and
determining that the driver views the person in case said angle of said person is included in said driver's view.

7. The traffic allowance method according to claim 5, wherein said determination of said image processor that said eyes of said person view the eyes of the driver, comprises the steps of:
capturing the persons' eyes by said second camera;
determining a center of view of said person being right angled to a line between said persons' eyes;
determining a view of said person by an angle surrounding said center of view of said person; and
determining that the person views the driver in case said angle of said person is included in said person's view.

8. A traffic allowance method, according to claim 1, wherein said capturing of the driver's head by said first camera and said capturing of the person by said second camera are during motion between said vehicle and said person, thereby said determination by said first camera that said driver views the person captured by said second camera comprises combined determinations of said first and second cameras during said motion.

* * * * *